United States Patent [19]
Perrine

[11] 4,015,973
[45] Apr. 5, 1977

[54] LIMESTONE-EXPANDING CLAY GRANULES AND METHOD OF MAKING THEM

[75] Inventor: Paul M. Perrine, Aurora, Ind.

[73] Assignee: American Pelletizing Corporation, Aurora, Ind.

[22] Filed: Dec. 20, 1974

[21] Appl. No.: 534,687

Related U.S. Application Data

[63] Continuation-in-part of Ser. No. 439,364, Feb. 4, 1974, abandoned, which is a continuation-in-part of Ser. No. 335,022, Feb. 23, 1973, abandoned.

[52] U.S. Cl. .................. 71/63; 71/64 DA; 71/64 SC; 423/430; 106/52
[51] Int. Cl.² .......................... C05D 3/02
[58] Field of Search ............ 71/59, 60, 63, 64 DA, 71/64 DC, 64 A, 64 SC; 423/430; 106/52

[56] References Cited
UNITED STATES PATENTS

| | | | |
|---|---|---|---|
| 3,214,261 | 10/1965 | Galloway | 71/51 |
| 3,615,811 | 10/1971 | Barrett | 106/52 X |
| 3,630,713 | 12/1971 | Adams | 71/64 D X |
| 3,692,511 | 9/1972 | Wilson et al. | 71/59 X |

Primary Examiner—Frank A. Spear, Jr.
Assistant Examiner—Ferris H. Lander
Attorney, Agent, or Firm—Melville Strasser Foster & Hoffman

[57] ABSTRACT

Limestone-expanding clay granules produced by charging a pulverizer and/or a mixer, with a raw material, which is high in calcium and/or magnesium, and an expanding clay binder, the expanding clay binder comprising from 1% and not more than 10% of the total charge. A portion of the material from the pulverizer is recycled back through the pulverizer, the amount recycled being determined by, among other things, the fineness of the raw material in the desired finished product. The remainder of the material from the pulverizer is caused to pass through a granulator, a dryer-cooler, and a finished product screen means. Fines from the finished product screen means are recycled directly to the pulverizer. Oversize material from the finished product screen is recycled to the pulverizer or to separate crusher and then back over the finished product screen means, where fines are removed and sent back to the pulverizer. When pulverizing is not required, the expanding clay binder is added to the raw material in the granulator along with the water, in slurry form, eliminating a separate mixing operation when the moisture content of the raw material is too high for the addition of the expanding clay binder in slurry form, it is either mixed in a high intensity mixer such as a cage mill or mixed in dry form in the granulator as the product is pelletized.

4 Claims, 1 Drawing Figure

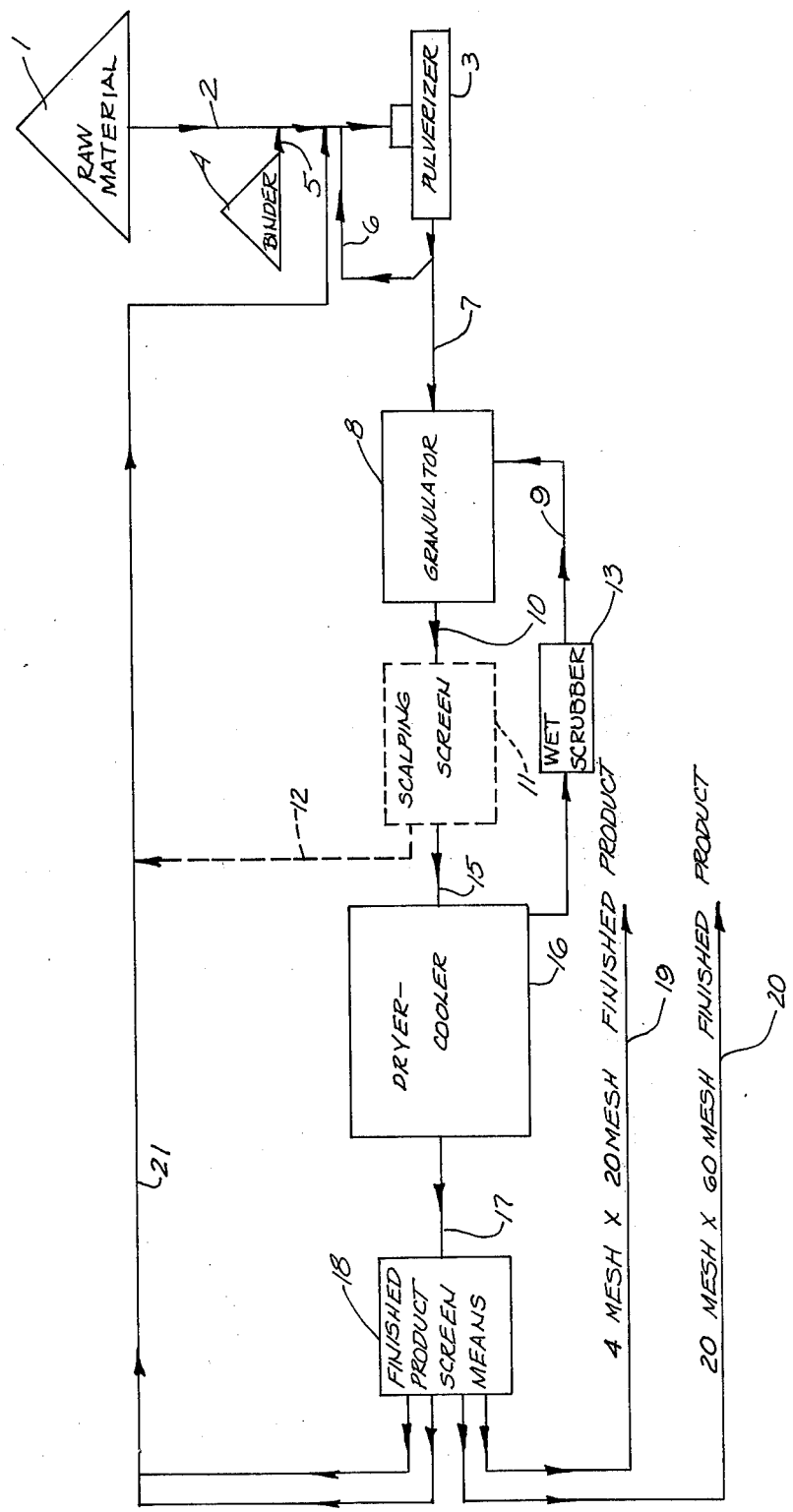

LIMESTONE-EXPANDING CLAY GRANULES AND METHOD OF MAKING THEM

CROSS REFERENCE TO RELATED APPLICATION

This application is a continuation-in-part of application Ser. No. 439,364, filed Feb. 4, 1974, in the name of Paul M. Perrine, and entitled "LIMESTONE-EXPANDING CLAY GRANULES AND METHOD OF MAKING THEM," which in turn is a continuation-in-part of an earlier filed application, Ser. No. 335,022, filed Feb. 23, 1973, in the name of Paul M. Perrine, and entitled "LIMESTONE-EXPANDING CLAY GRANULES AND METHOD OF MAKING THEM," both now abandoned.

BACKGROUND OF THE INVENTION

1. FIELD OF THE INVENTION

The present invention relates to limestone-bentonite clay granules and a method of making them, and more particularly to limestone granules having an expanding bentonite clay which also acts as a binding material.

2. DESCRIPTION OF THE PRIOR ART

As will be developed hereinafter, the limestone-expanding clay granules of the present invention have many uses. However, for purposes of an exemplary showing, the granules will be primarily described in their use as a soil neutralizer and conditioner which both neutralizes the soil and increases the water and neutrient holding capacity thereof.

Limestone ($CaCO_3$) and dolomitic limestone ($CaCO_3MgCO_3$) have long been used to reduce soil acidity. In a readily available form for agricultural purposes, limestone generally consists of about 80% by weight of particles which pass through an 8 mesh screen (all screen sizes stated hereinafter and in the claims are in accordance with the United States Bureau of Standards), and 20% by weight of particles which will not pass through an 8 mesh screen. Unfortunately, limestone of a particle size larger than 60 mesh is slow to react with the soil. Where rapid soil neutralizing is required, it would be desirable to grind the limestone so that a major portion of it will pass through a 60 mesh screen or finer. However such material presents handling problems including caking, dust and difficulty in confining it to the desired area.

To overcome these problems, prior art workers have striven to provide limestone granules through the use of binder materials and granulating agents. U.S. Pat. No. 3,214,261 is exemplary of the teachings of such granules and a method of making them.

In accordance with the above mentioned patent, binder materials such as diammonium phosphate, urea, or ammonium sulfate are used. The limestone and binder material are mixed in a dry state at a weight ratio of about 90 to 97% by weight limestone to 3 to 10% by weight binder material. When the limestone contains little or no magnesium, 3 to 7% of additional binder material is required.

The dry mix of limestone and binder material is granulated by the addition of a granulating agent such as water in an amount of from 10 to 20% by weight of the dry mix.

Soil neutralizers of the type taught in the above noted patent have certain disadvantages. First of all, the binder materials are too expensive to be practical and are of such nature as to require the soil neutralizer to be classified as a soil nutrient or fertilizer, which is confusing to the consumer. In addition, the binder materials, which are harmful, are acidic and detract from the neutralizing value of the final product and cause corrosion problems to the equipment used in the manufacturing process, adding to the cost of the soil neutralizers. Further, the neutralizing effect of such soil neutralizers is impaired by virtue of the acidic influence of the binder materials used and the dilution of the active material. The high percentage of binder materials required reduces the content of the neutralizing material in the end product. Finally, a substantial amount of water is required to disassociate or break down the soil neutralizers of the type taught in the above noted patent, delaying the availability of the calcium and magnesium carbonates to the soil.

The granular soil neutralizer and conditioner of the present invention is produced by combining an expanding clay which is pelletized simultaneously and acts as a binder material. The expanding clay binder material is an alkaline, is inexpensive and materially increases the water nutrient holding ability of the soil, e.g., its base exchange capacity, etc.

While prior art patents such as United States Letters Pat. Nos. 2,702,747, 2,976,162 and 3,615,811 have suggested the use of clays for coating fertilizers, for briquets to be used for melting furnace charges and as dispersants and binder additives to provide products for use in ceramic industries, respectively, no one has suggested combining an expanding clay which acts as a binder material to produce a granular soil neutralizer and conditioner with many advantageous side benefits and an opportunity to add small amounts of bentonite to the soil.

In accordance with the present invention, far less binder material and granulating agent are required, if so desired. The product of the present invention is characterized by stable granules which are free flowing, dust free and non-hygroscopic.

In accordance with the process of the present invention, raw material which is high in calcium and/or magnesium and an expanding clay are delivered directly to a pulverizer, such as a cage mill or other impact type grinder, wherein a completely homogeneous mix and necessary pulverizing is obtained as a result of the extremely high energy mixing and pulverizing action. This obviates the need for separate crushing means or mixing means.

A portion of the material from the cage mill is continuously recycled through the cage mill for further grinding. The amount of recycled material is determined by the fineness of the raw material in the desired finished product. This procedure eliminating the need for drying and separating equipment to remove oversized material. The granules are formed in a granulator using water from a wet scrubber as a granulating agent. This eliminates the need for a settlement pond or the like. Only a final product of the desired size or sizes is used, fines and oversized material being recycled.

When no pulverizing is required or when other factors make it possible to do so, the bentonite may be fed in slurry with the water directly into the granulator, which mixes the slurry and raw material at the same time the product is being pelletized.

It should be noted that utilization of a bentonite slurry allows the bentonite to swell to nearly its maximum volume, minimizing the amount of bentonite required when so desired, and increasing the hardness of the dried pellets regardless of the amount of bentonite used as compared to the same amount of dry bentonite.

SUMMARY OF THE INVENTION

The granules of the present invention are formed from raw material which is high in calcium and/or magnesium and bentonite which also acts as a binder. The raw materials are continuously fed into and intimately mixed in a pulverizer, such as a cage mill. A portion of the homogeneous mix from the cage mill (or other impact type grinder) is continuously recycled back through the cage mill. The remainder of the cage mill mix is transferred to a granulator wherein granules are formed throgh the use of water as a granulating agent.

Material from the granulator is introduced into a dryer-cooler and thence to a finished product screen means. The finished product screen means provides a finished screen means. The finished product screen means provides a finished product in one or more sizes. Fines from the finished product screen means are recycled to the cage mill. Oversized material from the finished product screen means is also recycled to the cage mill or to a separate crusher.

The granules of the present invention dissociate rapidly when wet, with the high expanding rate of the bentonite material upon absorption of moisture forceably dissociating or breaking down the granules to make the neutralizing material and bentonite therein readily and rapidly available to the soil in the fastest possible time. The beneficial expanding clay material also markedly increases the water and nutrient holding ability of the soil. Finally, since the expanding clay is alkaline, having a pH in substantially the same range limestone, it also adds to the neutralizing value of the finished granules.

BRIEF DESCRIPTION OF THE DRAWINGS

The FIGURE comprises a diagrammatic representation of the process of the present invention.

DESCRIPTION OF THE PREFERRED EMBODIMENTS

This invention comprises a fast acting, free flowing, granular product which may be used for, among other things, as a soil neutralizer and conditioner which disintegrates readily when contacted by water or soil moisture. The granules consist of finely divided raw materials or soil conditioner and a one of which also acts as a binding agent. It will be understood that the term "soil conditioner" as used herein is intended to mean a compound or composition used to raise the pH of the soil or to increase the water and nutrient holding capacity of the soil.

The raw materials of the present invention are materials which are high in calcium and/or magnesium bentonite clay. Preferably, although not necessarily limited thereto, such materials comprise limestone of the type having a high $CaCO_3$ content of about 97 (about 39% calcium by weight) or a dolomitic limestone having a total $CaCo_3$ and $MgCO_3$ content of about 97%, the calcium carbonate portion thereof containing about 39% calcium by weight and the magnesium carbonate portion thereof containing about 28% magnesium by weight. However, suitable raw materials include those materials having a content of at least 50% combined carbonates or the equivalent in the element calcium and/or magnesium itself. Additionally, such materials may also comprise burned lime, marl, crushed oyster shells, marble or slag. Such materials preferably will contain about 25% by weight of calcium.

In the FIGURE, a storage means or hopper for the limestone is shown at 1. The raw materials, which may be of any size but preferably of about 1 inch or less, is charged by means of a conveyor 2 to a pulverizing means 3.

One of the materials used in accordance with the present invention is a high expansion or high swelling clay, i.e., a clay which, when wetted, will swell and also act as a binder. Examples of high expansion clays are sodium bentonite, calcium bentonite and montmorillonite.

Calcium bentonite swells, when wetted, to a maximum of about twice its dry volume. Sodium bentonite, on the other hand, swells, to as much as 20 times its dry volume, when wetted. While not intended to be limiting, sodium bentonite is preferred for its swelling characteristics as a soil conditioner and is also preferred for its binder characteristics in the practice of the present invention. Additionally, sodium bentonite can be put in slurry to obtain maximum binding action.

The expanding clays, used as a raw material herein, have been found to markedly increase the moisture and nutrient holding capacity of the soil and to increase its base exchange capacity. Furthermore, the swelling abilities of the expanding clays make them excellent binder materials, producing strong, stable, non-hygroscopic granules. The high expanding rate of the expanding clays upon absorption of moisture forceable dissociates or breaks down the granules to make both materials therein readily and rapidly available to the soil in the fastest possible time. Since the expanding clays are alkaline, having a pH in substantially the same range as limestone, they in fact add to the neutralizing value of the finished granules as well as contributing to soil productivity through their own beneficial aspects.

In the FIGURE, a storage means for the bentonite is shown at 4. The bentonite, either in a slurry, pulverized, or granular form, is metered into the charge of the pulverizing means 3, as at 5.

The pulverizing means 3 may take any suitable from. A cage mill or other impact type grinding equipment has been used with complete success. The metering of the binder material into the pulberizer 3 as the limestone is ground therein eliminates the need for additional mixing equipment and reduces the amount of binder material required. This is true since an intimate, completely homogeneous mix is obtained as a result of the high energy mixing action of the cage mill. In the practice of the present invention, it has been found that the expanding clay material may be added to the raw material in an amount of from 1 to 10% by weight of the dry mix. However, in most applications the bentonite material may be present in an amount of from 1.5 to 8% by weight of the dry mix and, normally, in an amount of about 2.5% by weight of the dry mix.

The mix within the cage mill, which is used for both grinding and/or mixing in a one step operation, is reduced to a size such that all or a substantial portion thereof will pass a 100 mesh screen. To assure a proper size of the raw material bentonite mix from the cage mill and a proper size of the final product, a protion of the mix from the cage mill is continuously recycled through the cage mill. The use of a cage mill or similar pulverizing means 3 eliminates the necessity for predrying the limestone feed in order to grind it. The moisture content of the limestone feed will vary from 0 to 10%, but will normally be about 2% or higher. The continuous recirculation of a portion of the mix from the pulverizer 3, as indicated at 6, eliminates the necessity for screening the mix in order to increase the product fineness. It has also been found that this recirculating procedure produces the needed fines for a more uniform final product. The amount of material recirculated is dependent upon a number of variables; such as, for example, the moisture content, hardness and particle size of the raw and binder materials, the type of pulverizer of cage mill utilized in the process, and the fineness of the raw and binder materials necessary to pellitize and form the desired end product, and is best determined by routine experimentation, selecting that amount of recirculation which will yield the best end product.

If the raw material feed in conveyor 2 is already sufficiently fine, the pulverizer 3 may be replaced by a high energy mixer. A high energy mixer may be used to assure the required homogeneous mix of dry raw materials. When a slurry of bentonite and water is used the slurry may be sprayed into the granulator.

That portion of the mix from the pulverizer 3, which is not recirculated, is conveyed as at 7 to a granulator 8. The granulator 8 may be of any type including a rotary driven or pan-type granulator or mixergranulator. While a rotary drum type granulator may be utilized, it has been found that a pan-type granulator is preferable. This is so because the dropping of material in the rotary drum has a tendency to cause the formation of globular shaped particles if the moisture content of the raw and binder material mix is a little too high. In the granulator, a granulating agent such as water is added to the mix, as at 9, and granules are formed. With the bentonite of the present invention, it has been found that gradually adding water thereto so that the mixture has a water content of from about 1 to about 15% and normally 8% by weight, based on the weight of the dry material, is required as an actuating agent for the bentonite.

Granules from the granulator are conveyed to the dryer-cooler 16. The dryer-cooler 16 is of the conventional fluid bed type wherein the granules are subjected to a flow of air at a temperature within the range from about 100° to about 1000° F., and normally at a temperature about 350° F. However, it will, of course, be understood that the drying temperature is based upon a combination of temperature, air volume and retention time of the granules in the dryer-cooler 16.

It should perhaps be noted that it has been found in practice that if the granulator 8 is of the rotary drum type, granules therefrom should be directed to a scalping screen 11 (as shown in dashed lines) of the well known single-deck type prior to their direction to the dryer-cooler 16. The scalping screen eliminates oversize, malformed granules which are conveyed, as at 12, to the conveyor means 20 leading to the pulverizer 3.

From the dryer-cooler 16, the granules are conveyed as at 17 to the finished product screen means 18. Again, the screen means 18 may be conventional and may have any appropriate arrangement, depending upon the product or products desired.

In the FIGURE, the finished product screen means 18 is diagrammatically indicated as a three-deck screen means whereby the finished product may be provided in two size ranges. While not intended to be limiting, for purposes of an exemplary showing the FIGURE illustrates a conveying means 19 for a first product so sized that substantially 100% will pass a ½ inch screen and substantially 100% will be retained by a 60 mesh screen. At 20 a conveyor means is diagrammatically indicated for a product so sized that substantially 100% will pass a 20 mesh screen and substantially 100% will be retained by a 60 mesh screen. Fines (i.e. that material passing through a 60 mesh screen) are recycled via conveyor means 21 to the pulverizer 3. It should be noted that the expanding clay of the present invention is such an efficient binder in agglomerating the raw material that the process generally creates a mxximum of about 7.0% oversize material and about 5.0% fines by weight.

The finished product may either be bagged or shipped in bulk. None of the constitutents of the final product are hygroscopic, and therefore the product is not materially affected by being exposed to the atmosphere. The final product is characterized by strong, uniform granules.

The size of the granules of the finished product does not constitute a limitation on the present invention. For example, if the product is to be mixed with fertilizer granules or the like, it may be desirable to provide granules of such size that 100% pass through a 6 mesh screen and 100% are retained by a 20 mesh screen. It has been found, for example, that a product having a granule size such that 100% pass through a 6 mesh screen and 100% are retained by a 20 mesh screen has excellent spreading characteristics, the granules being stable, free flowing and dust free.

In the practice of the present invention it has been found advantageous to use water derived from the wet scrubber 13 as the granulating agent entering granulator 8 via conduit 9. The use of the wet scrubber 13 as a source of water enables the return of fines from the scrubber 13 to the granulator 8, conserves fuel since the water from the scrubber 13 is already hot, and eliminates the need for a settling pond or other water pollution control equipment. This can be mixed with bentonite when the bentonite is put in slurry form.

Examples of the present invention may be given as follows:

EXAMPLE I 750 pounds per hour of sodium bentonite in pulverized form was metered into a stream of 50,000 pounds per hour (dry basis) of limestone containing 97.78% calcium carbonate. The limestone had a lump size of less than 1 inch. The limestone-bentonite stream was fed into a 50 inch cage-type pulverizer wherein it was intimately mixed and reduced to a particle size such that 75% passed a 100 mesh screen. Approximately 33% of the mix from the pulverizer was recirculated through the pulverizer continuously.

The mix from the pulverizer was fed to a 15 foot diameter pan granulator into which water from the scrubber was sprayed onto the incoming mix. The water was introduced into the granulator at the rate of about 6,500 pounds per hour.

The granulator pan was given an inclination of about 60° and was rotated at about 17 rpm. Pellets from the granulator were dried in a 5 foot by 25 foot fluid bed dryer-cooler with air at a temperature of 350° F. The dried material from the dryer-cooler was conveyed to a finished product screen means wherein it was separated into three sizes: a finished product such that 100% was passed by an 8 mesh screen and 100% was retained by a 30 mesh screen; fines passed by the 30 mesh screen and oversized material retained by the 8 mesh screen. The fines and oversized material were recycled to the granulator via the pulverizer. The finished product represented 88% of the material from the dryer-cooler. The finished product had a calcium carbonate content of 96.33% by weight.

EXAMPLE 2

The same procedure was followed as indicated in Example 1, except that dolomite was substituted for the limestone. The dolomite had a magnesium carbonate content of 41.2% by weight and a calcium carbonate content of 56.1% by weight. The final product had a total carbonate content of 95.5% by weight.

EXAMPLE 3

Again, the same procedure was followed as that given in Example 1. In this instance, however, the feed to the cage mill comprised 50,000 pounds per hour (dry basis) limestone (having a calcium carbonate content of 97.78%), 750 pounds per hour sodium bentonite and 600 pounds per hour expanded vermiculite. Water from the scrubber was sprayed on the dry mix in the granulator at the rate of 8,000 pounds per hour. The final granular porduct had a calcium carbonate content of 95.20% by weight, but was a light weight product having a weight of 78 pounds per cubic foot (as opposed to ordinary density of 100 pounds/cubic foot).

The final product of each of the three Examples above had a granule size such that 100% of them passed through an 8 mesh screen and 100% of them were retained by a 30 mesh screen. The comparable hardness of the granules produced in the three Examples was determined by taking each of the products and placing 100 grams thereof on a No. 40 riddle on a standard Rotap machine. Each of the samples was subjected to oscillation and tapping action for 4 minutes. The weight percent of each sample remaining on the 40 mesh screen was then determined.

EXAMPLE 4

1050 pounds per hour of sodium bentonite in pulverized form was metered into a stream of 48,950 pounds per hour (dry basis) of limestone containing 97.78% calcium carbonate. The limestone had a lump size of less than 1 inch. The limestonebentonite stream was fed into a 50 inch cage-type pulverizer wherein it was intimately mixed and reduced to a particle size such that 75% passed a 100 mesh screen. Approximately 33% of the mix from the pulverizer was recirculated through the pulverizer continuously.

The mix from the pulverizer was fed to a 15 foot diameter pan granulator into which water from the scrubber was sprayed onto the incoming mix. The water was introduced into the granulator at the rate of about 6,500 pounds per hour.

The granulator pan was given an inclination of about 60° and was rotated at about 17rpm. Pellets from the granulator were dried in a 5 foot by 25 foot fluid bed dryer-cooler with air at a temperature of 350° F. The dried material from the dryer-cooler was conveyed to a finished product screen means wherein it was separated into three sizes: a finished product such that 100% was passed by an 8 mesh screen and 100% was retained by a 30 mesh screen; fines passed by the 30 mesh screen and oversized material retained by the 8 mesh screen. The fines and oversized material were recycled to the granulator via the pulverizer. The finished product represented 88% of the material from the dryercooler and had a calcium carbonate content of 96.33% by weight. The finished product contained 2.1% bentonite and 97.9% raw material by weight (dry basis).

EXAMPLE 5

The same procedure was followed as indicated in Example 4, except that dolomite was substituted for the limestone. The dolomite had a magnesium carbonate content of 41.2% by weight and a calcium carbonate content of 56.1% by weight. The final product had a total carbonate content of 95.5% by weight. The final product contained 2.1% bentonite and 97.9% raw material by weight.

EXAMPLE 6

Again, the same procedure was followed as that given in Example 4. In this instance, however, the feed to the cage mill comprised 48,950 pounds per hour (dry basis) limestone (having a calcium carbonate content of 97.78%). 1050 pounds per hour sodium bentonite in slurry form mixed with water from the scrubber was sprayed on the dry mix in the granulator at the rate of 8,000 pounds per hour of slurry. The final granular product contained 2.1% bentonite and 97.9% raw material by weight.

EXAMPLE 7

The same procedure was followed as indicated in EXAMPLE 4, except that in this instance the feed to the cage mill comprised 49,500 pounds per hour (dry basis) limestone (having a calcium carbonate content of 97.78%). 500 pounds per hour sodium bentonite in slurry form mixed with water from the scrubber was sprayed on the dry mix in the granulator at the rate of 7450 pounds per hour of slurry. The final granular product contained 1% bentonite and 99% raw material by weight.

EXAMPLE 8

The same procedure was followed as indicated in EXAMPLE 4, except that 2500 pounds per hour of sodium bentonite in pulverized from was metered into a stream of 47,500 pounds per hour (dry basis) of limestone containing 97.78% calcium carbonate. The finished product represented 91% of the material from the dryer-cooler and had a calcium carbonate content of 92.89% by weight. The finished product contained 5.0% bentonite and 95.0% raw material by weight.

EXAMPLE 9

The same procedure was followed as indicated in EXAMPLE 1, except that 5000 pounds per hour of sodium bentonite in pulverized form was metered into a stream of 45,000 pounds per hour (dry basis) of limestone containing 97.78% calcium carbonate. The finished product represented 91% of the material from the dryer-cooler and had a calcium carbonate content of 88% by weight. The finished product contained 10.0% bentonite and 90.0% raw material by weight.

The final product of each of the nine EXAMPLES above had a granule size such that 100% of them passed through an 8 mesh screen and 100% of them were retained by a 30 mesh screen. The comparable hardness of the granules produced in the nine EXAMPLES was determined by taking each of the products and placing 100 grams thereof on a No. 40 riddle on a standard Rotap machine. Each of the samples was subjected to oscillation and tapping action for four minutes. The weight percent of each sample remaining on the 40 mesh screen was then determined. The results are given in TABLE 1 below.

TABLE I

| | EXAMPLE NUMBER | | | | | | | | |
|---|---|---|---|---|---|---|---|---|---|
| | 1 | 2 | 3 | 4 | 5 | 6 | 7 | 8 | 9 |
| % sample remaining on the 40 mesh screen | 97.6 | 96.1 | 96.3 | 96.6 | 96.1 | 97.8 | 95.8 | 97.2 | 97.7 |
| % sample lost through the 40 mesh screen | 2.4 | 3.9 | 3.7 | 3.4 | 3.9 | 2.2 | 4.2 | 2.8 | 2.3 |

The ability of the granules of each EXAMPLE to quickly disintegrate when wet was measured. This was accomplished by spreading a 100 gram sample of each of the final products of the nine EXAMPLES in a 12 inch diameter pan and covering the particles with water to a depth of ½ inch. The particles began to crumble and "boil" apart due to the swelling or expanding action of the clay binder material.

When all visible action stopped, the water and product were greatly introduced onto a 100 mesh screen and one quart of water was used to gently wash the remaining particles on the screen. The remaining particles were dried and weighed. In TABLE II below, the percentage of material remaining on the 100 mesh screen is compared to the amount of original mix from the pulverizer, prior to granulating, which would be retained on a 100 mesh screen.

TABLE II

| | EXAMPLE NUMBER | | | | | | | | |
|---|---|---|---|---|---|---|---|---|---|
| | 1 | 2 | 3 | 4 | 5 | 6 | 7 | 8 | 9 |
| % material retained on the 100 mesh screen: disintegrated granulated material | 28.3 | 25.3 | 29.1 | 28.3 | 25.3 | 28.7 | 28.5 | 32.8 | 37.4 |
| original pulverized mix | 26.6 | 24.1 | 28.2 | 28.6 | 24.1 | 28.4 | 28.4 | 31.1 | 36.2 |
| time in seconds required for granulated material to start disintegrating | 20 | 28 | 38 | 20 | 28 | 18 | 15 | 42 | 45 |
| time until visible disintegrating action stopped | 6min. 35sec. | 5min. 45sec. | 7min. 10sec. | 6min. 35sec. | 5min. 45sec. | 4min. 12sec. | 3min. 18sec. | 8min. 9sec. | 9min. 15sec. |

None of the products of the nine EXAMPLES above is hygroscopic and therefore is not materially affected by being exposed to the atmosphere.

As indicated above, the expanding clay granules of the present invention have uses other than as a soil neutralizer. For example, they are being used as a fertilizer filler. It is common practice in fertilizer blending plants to mix a filler material such as crushed stone, sand and the like with the other ingredients making up the complete ferfilizer. When limestone is used as a filler, for example, it will generally be crushed to a size such that 100% will pass a 6 mesh screen and 100% will be retained on a 16 mesh screen. This particle size will correspond to the particle size of the fertilizer granules. To make such an accurately sized product is expensive and no real benefit is derived from the filler material.

Through the use of the granules of the present invention, a limestone and bentonite pulverized to the extent that 70% will pass a 100 mesh screen, for example, may be formed into granules of appropriate size for a beneficial filler material. In use the granules will quickly dissolve, making the fine limestone rapidly available as a soil neutralizer and the bentonite available to increase the base exchange capacity of the soil. Accordingly, the filler material will indeed be of some benefit.

Examples of the present invention used as a fertilizer filler may be given as follows:

EXAMPLE 10

Fertilizer Grade — 15—15—15
456 pounds of Potash
652 pounds of Diammonium Phosphate
406 pounds of Urea
458 pounds of Pelletized Limestone

EXAMPLE 11

Fertilizer Grade — 6—6—18
330 pounds of Ammonium Nitrate
260 pounds of Triple Super Phosphate
700 pounds of Potash
710 pounds of Pelletized Limestone

EXAMPLE 12

Fertilizer Grade — 0—25—25
1060 pounds Triple super phosphate
810 pounds Nitrate of Potash
130 pounds Pelletized Limestone Fertilizers have what is known as a "potential acidity in terms of calcium carbonate equivalent" which, by law, must be indicated on each bag of fertilizer. The granules of the present invention may be mixed in exactly the right proportion with any grade of fertilizer to completely neutralize the potential acidity thereof, allowing the fertilizer manufacturer of mixes to produce and sell a completely neutral fertilizer.

An example of the present invention mixed in the right porportion with a fertilizer to completely neutralize the potential acidity thereof may be given as follows:

EXAMPLE 13

The potential acidity of 10 pounds of 22—5—5 grade fertilizer, which requires 600 pounds of calcium carbonate per ton to neutralize the potential acidity thereof, is neutalized by mixing therewith 3.33 pounds of pelletized limestone-bentonite.

The uses of the granules of the present invention are not necessarily restricted to those associated with the soil. It is common practice, for example, to use calcium carbonate as a calcium source for livestock, poultry and other animals. The calcium carbonate is generally mixed with the feed. The size of the calcium carbonate particles is usually determined by the size of the other particles making up the feed. The particle size of all of the feed ingredients must be approximately the same to avoid segregation, but cannot be so fine as to be dusty. As a result of this, very little consideration can be given to the particle size of the calcium carbonate with respect to that which would be ideal for maximum availability of the calcium carbonate to be taken up by the animal's body in the stomach and intestinal tract. Generally, a particle size such that 100% is retained on an 80 mesh screen is used, which size is too large to obtain efficient results and a significant portion of the calcium carbonate fed to the animals passes through them and is wasted. In accordance with the present invention finely ground calcium carbonate (70% passing a 100 mesh screen, for example) are being formed into granules of appropriate size (for example 100% passing an 8 mesh screen and 100% retained on a 20 mesh screen). The granules are mixed with the feed, but quickly dissolve in the animal's stomach and return the calcium carbonate to its powder form which is far more readily taken up by the animal's body. This results in a reduction in the amount of calcium carbonate required to be fed to each animal with an attendant cost savings. In this application the percentage of bentonite is held to a minimum, making the slurrying of the bentonite most valuable for producing pellets with less bentonite.

In coal mines it is a common practice to mix finely ground high calcium limestone (for example, that which will pass a 200 mesh screen) with water and spray it on the mine entry walls and floor to hold down coal dust and lighten the color of the entry surfaces. When granules of the present invention are used for this purpose, they may be more conveniently handled in bag or bulk, thereby reducing the overall cost of the operation.

In a similar manner, the granules of the present invention may be used in water treatment facilities. Furthermore, the granules of the present invention may be used to soak up and neutralize water, manure, etc., on the floors of barns and stables and water, grease, etc., in workshops, factories and the like.

Modifications may be made in the invention without departing from the spirit of it.

The embodiments of the invention in which an exclusive property or privilege is claimed are defined as follows:

1. The process of preparing soil neutralizer and conditioner granules which both neutralize the soil and increase the water and neutrient holding capacity thereof, which comprises the steps:
   A. mixing and grinding about 90 to 99% by weight of a finely divided calcium and magnesium bearing raw material selected from the group consisting of limestone, dolomitic limestone, and marl, with about 1% to 10% by weight of high expansion sodium bentonite;
   B. continuously recycling a portion of the mixture for further grinding to produce the needed percentage of fines for a better and more uniform final product;
   C. agitating the mixture and gradually adding water thereto so that the mixture has a water content of from about 1 to about 15% by weight, based on the weight of the dry material, to form granules, said water being sufficient in amount to activate the sodium bentonite;
   D. drying the granules at a temperature within the range from about 100° to about 1000° F., and
   E. screening the dried granules to recover the granules having a particle size which will pass through a ½ inch screen and at least be retained on a 60 mesh screen, said granules containing about 90 to 99% by weight of said raw material and about 1 to 10% by weight of said sodium bentonite.

2. The method according to claim 1, wherein about 8% by weight of water, based on the weight of the dry material is gradually added to the mixed during said agitating step.

3. The method according to claim 1, wherein the granules are dried at a temperature of about 350° F.

4. The process of preparing soil neutralizer and conditioner granules which both neutralize the soil and increase the water and nutrient holding capacity thereof, which comprises the steps:
   A. agitating about 90 to about 99% by weight of a finely divided calcium and magnesium bearing raw material selected from the group consisting of limestone, dolomitic limestone, and marl and adding a slurry of high expansion sodium bentonite thereto to form granules, the mixture having a water content of from about 1 to about 15% by weight of water, based on the weight of the dry material, and about 1 to about 10% by weight of high expansion sodium bentonite, based on the weight of the dry material, the water in said slurry being sufficient in amount to swell said sodium bentonite to nearly its maximum volume, minimizing the amount of sodium bentonite required and increasing the hardness of the granules;
   B. drying the granules at a temperature within the range from about 100° to about 1000° F; and
   C. screening the dried granules to recover the granules having a particle size which will pass through a ½ inch screen and at least be retained on a 60 mesh screen, said granules containing about 90 to about 99% by weight of said raw material and about 1 to about 10% by weight of said sodium bentonite.

* * * * *